US011935510B2

(12) United States Patent
Handa et al.

(10) Patent No.: US 11,935,510 B2
(45) Date of Patent: Mar. 19, 2024

(54) INFORMATION PROCESSING DEVICE, SOUND MASKING SYSTEM, CONTROL METHOD, AND RECORDING MEDIUM

(71) Applicant: Mitsubishi Electric Corporation, Tokyo (JP)

(72) Inventors: Kaori Handa, Tokyo (JP); Masaru Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 247 days.

(21) Appl. No.: 17/518,940

(22) Filed: Nov. 4, 2021

(65) Prior Publication Data

US 2022/0059068 A1 Feb. 24, 2022

Related U.S. Application Data

(63) Continuation of application No. PCT/JP2019/020250, filed on May 22, 2019.

(51) Int. Cl.

*G10K 11/175* (2006.01)
*G10L 25/60* (2013.01)
*G10L 25/63* (2013.01)
*G10L 25/84* (2013.01)

(52) U.S. Cl.

CPC .......... *G10K 11/1754* (2020.05); *G10L 25/60* (2013.01); *G10L 25/63* (2013.01); *G10L 25/84* (2013.01)

(58) Field of Classification Search

None

See application file for complete search history.

(56) References Cited

U.S. PATENT DOCUMENTS

2019/0013003 A1 1/2019 Baughman et al.
2019/0205839 A1* 7/2019 Dotan-Cohen ....... H04L 67/535

FOREIGN PATENT DOCUMENTS

JP 2008-15191 A 1/2008
JP 2013-7911 A 1/2013

(Continued)

OTHER PUBLICATIONS

International Search Report, issued in PCT/JP2019/020250, dated Jul. 9, 2019.

(Continued)

*Primary Examiner* — Kenny H Truong

(74) *Attorney, Agent, or Firm* — Birch, Stewart, Kolasch & Birch, LLP

(57) ABSTRACT

An information processing device includes a first acquisition unit that acquires a sound signal outputted from a mic, an acoustic feature detection unit that detects an acoustic feature based on the sound signal, an identification unit that identifies first discomfort condition information corresponding to a first work type of work performed by a user, among one or more pieces of discomfort condition information specifying discomfort conditions using the acoustic feature and corresponding to one or more work types, based on work type information indicating the first work type, and an output judgment unit that judges whether first masking sound should be outputted or not based on the acoustic feature detected by the acoustic feature detection unit and the first discomfort condition information.

8 Claims, 5 Drawing Sheets

(56) References Cited

FOREIGN PATENT DOCUMENTS

| | | | |
|---|---|---|---|
| JP | 2014-154483 | A | 8/2014 |
| JP | 6140469 | B2 | 5/2017 |

OTHER PUBLICATIONS

Written Opinion of the International Searching Authority, issued in PCT/JP2019/020250, dated Jul. 9, 2019.
Extended European Search Report for corresponding European Application No. 19929955.3, dated Mar. 16, 2022.
Office Action dated Oct. 20, 2022 in corresponding Australian Patent Application No. 2019447456.

* cited by examiner

INFORMATION PROCESSING DEVICE, SOUND MASKING SYSTEM, CONTROL METHOD, AND RECORDING MEDIUM

CROSS-REFERENCE TO RELATED APPLICATION

This application is a continuation application of International Application No. PCT/JP2019/020250 having an international filing date of May 22, 2019, the disclosure of which is incorporated herein by reference in its entirety.

BACKGROUND OF THE INVENTION

1. Field of the Invention

The present disclosure relates to an information processing device, a sound masking system, a control method and a recording medium storing a control program.

2. Description of the Related Art

Sound occurs in places like offices. For example, the sound is voice, typing noise or the like. A user's ability to concentrate is deteriorated by sound. In such a circumstance, a sound masking system is used. The deterioration in the user's ability to concentrate can be prevented by using the sound masking system.

Here, a technology regarding the sound masking system has been proposed (see Patent Reference 1: Japanese Patent Application Publication No. 2014-154483).

Incidentally, there are cases where the sound masking system is controlled based on the volume level of sound acquired by a microphone. However, there is a problem in that this control does not take the type of work performed by the user into consideration.

SUMMARY OF THE INVENTION

An object of the present disclosure is to execute sound masking control based on the work type of the user.

An information processing device according to an aspect of the present disclosure is provided. The information processing device includes a first acquisition unit that acquires a sound signal outputted from a microphone, an acoustic feature detection unit that detects an acoustic feature based on the sound signal, an identification unit that identifies first discomfort condition information corresponding to a first work type of work performed by a user, among one or more pieces of discomfort condition information specifying discomfort conditions using the acoustic feature and corresponding to one or more work types, based on work type information indicating the first work type, and an output judgment unit that judges whether first masking sound should be outputted or not based on the acoustic feature detected by the acoustic feature detection unit and the first discomfort condition information.

According to the present disclosure, it is possible to execute sound masking control based on the work type of the user.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein.

DETAILED DESCRIPTION OF THE INVENTION

An embodiment will be described below with reference to the drawings. The following embodiment is just an example and a variety of modifications are possible within the scope of the present disclosure.

Embodiment

Figure 1:
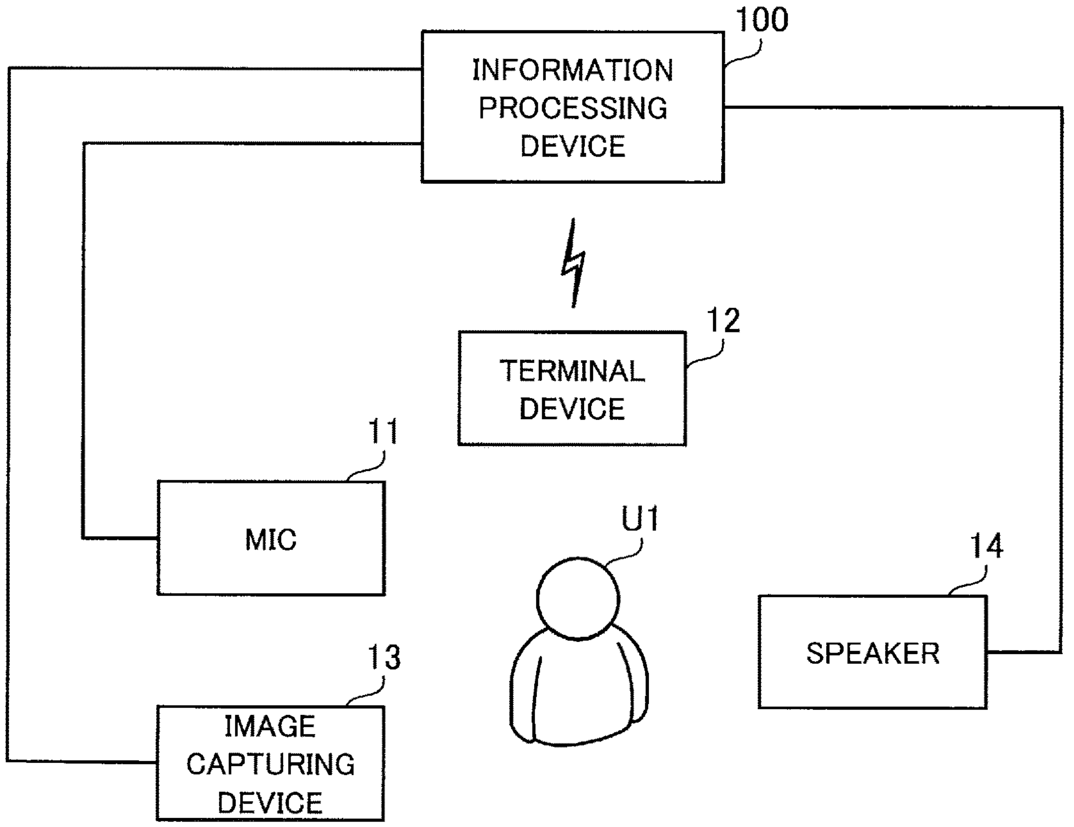
FIG. 1 is a diagram showing a sound masking system.

FIG. 1 is a diagram showing a sound masking system. The sound masking system includes an information processing device 100 and a speaker 14. Further, the sound masking system may include a mic 11, a terminal device 12 and an image capturing device 13. Here, the mic is a microphone. The microphone will hereinafter be referred to as a mic.

For example, the mic 11, the terminal device 12, the image capturing device 13 and the speaker 14 exist in an office. The information processing device 100 is installed in the office or in a place other than the office. The information processing device 100 is a device that executes a control method.

FIG. 1 shows a user U1. In the following description, the user U1 is assumed to be in the office.

The mic 11 acquires sound. Incidentally, this sound may be represented as environmental sound. The terminal device 12 is a device used by the user U1. For example, the terminal device 12 is a Personal Computer (PC), a tablet device, a smartphone or the like. The image capturing device 13 captures an image of the user U1. The speaker 14 outputs masking sound.

Next, hardware included in the information processing device 100 will be described below.

Figure 2:
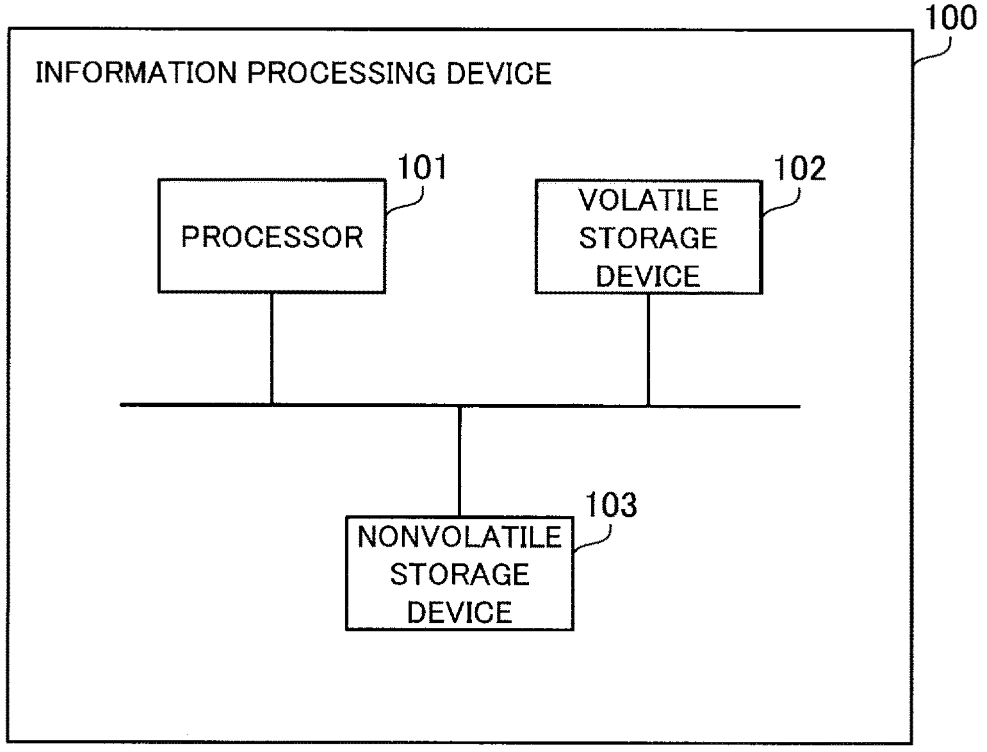
FIG. 2 is a diagram showing a configuration of hardware included in an information processing device.

FIG. 2 is a diagram showing the configuration of the hardware included in the information processing device. The information processing device 100 includes a processor 101, a volatile storage device 102 and a nonvolatile storage device 103.

The processor 101 controls the whole of the information processing device 100. For example, the processor 101 is a Central Processing Unit (CPU), a Field Programmable Gate Array (FPGA) or the like. The processor 101 can also be a multiprocessor. The information processing device 100 may be implemented by a processing circuitry or may be implemented by software, firmware or a combination of software and firmware. Incidentally, the processing circuitry can be either a single circuit or a combined circuit.

The volatile storage device 102 is main storage of the information processing device 100. For example, the volatile storage device 102 is a Random Access Memory (RAM). The nonvolatile storage device 103 is auxiliary storage of the information processing device 100. For example, the nonvolatile storage device 103 is a Hard Disk Drive (HDD) or a Solid State Drive (SSD).

Figure 3:
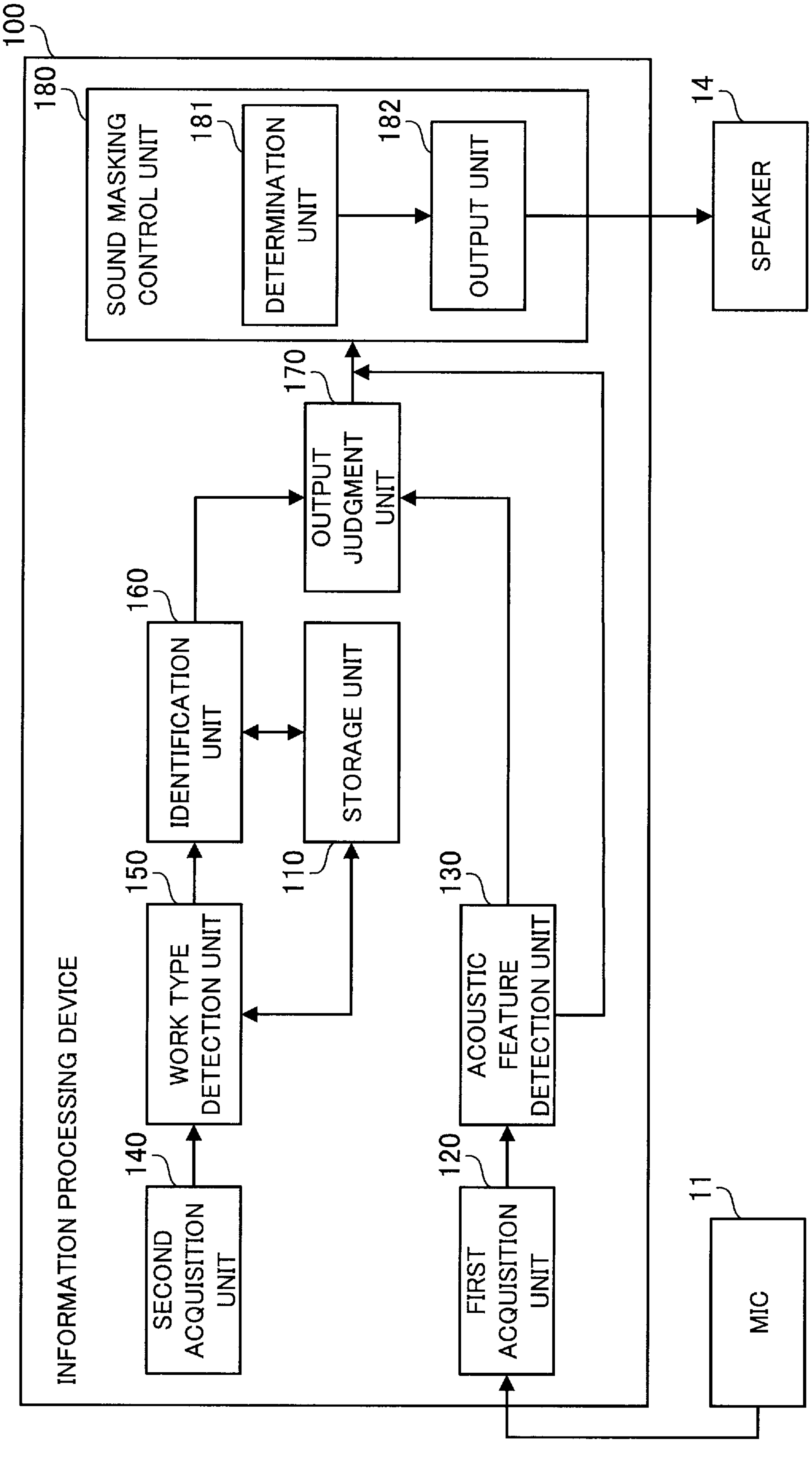
FIG. 3 is a functional block diagram showing a configuration of the information processing device.

FIG. 3 is a functional block diagram showing the configuration of the information processing device. The information processing device 100 includes a storage unit 110, a first acquisition unit 120, an acoustic feature detection unit 130, a second acquisition unit 140, a work type detection unit 150, an identification unit 160, an output judgment unit 170 and a sound masking control unit 180. The sound masking control unit 180 includes a determination unit 181 and an output unit 182.

The storage unit 110 may be implemented as a storage area secured in the volatile storage device 102 or the nonvolatile storage device 103.

Part or all of the first acquisition unit 120, the acoustic feature detection unit 130, the second acquisition unit 140, the work type detection unit 150, the identification unit 160, the output judgment unit 170 and the sound masking control unit 180 may be implemented by the processor 101.

Part or all of the first acquisition unit 120, the acoustic feature detection unit 130, the second acquisition unit 140, the work type detection unit 150, the identification unit 160, the output judgment unit 170 and the sound masking control unit 180 may be implemented as modules of a program executed by the processor 101. For example, the program executed by the processor 101 is referred to also as a control program. The control program has been recorded in a record medium, for example.

Here, information stored in the storage unit 110 will be described below.

Figure 4:
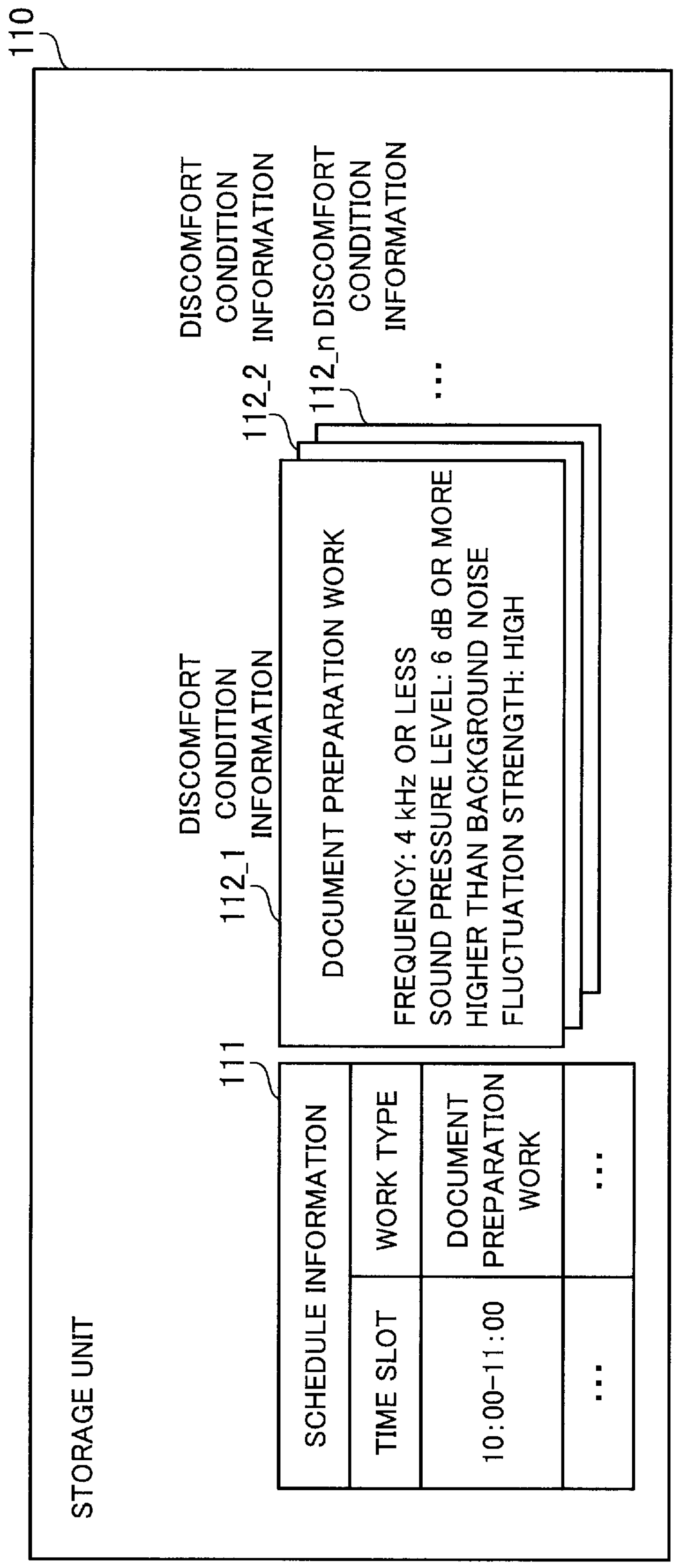
FIG. 4 is a diagram showing a concrete example of information stored in a storage unit.

FIG. 4 is a diagram showing a concrete example of the information stored in the storage unit. The storage unit 110 may store schedule information 111. The schedule information 111 is information indicating a work schedule of the user U1. Further, the schedule information 111 indicates the correspondence between a time slot and a work type. Specifically, the schedule information 111 indicates the correspondence between a time slot and the type of work performed by the user U1. For example, the work type can be document preparation work, creative work, office work, document reading work, investigation work, data processing work, and so forth. For example, the schedule information 111 indicates that the user U1 performs document preparation work from 10 o'clock to 11 o'clock.

Further, the storage unit 110 stores one or more pieces of discomfort condition information. Specifically, the storage unit 110 stores discomfort condition information 112_1, 112_2, . . . , **112_*n*** (n: integer greater than or equal to 3). The one or more pieces of discomfort condition information specify discomfort conditions using acoustic features and corresponding to one or more work types. This sentence can also be expressed as follows: The one or more pieces of discomfort condition information specify discomfort conditions based on acoustic features and corresponding to one or more work types.

For example, the discomfort condition information 112_1 indicates a discomfort condition in document preparation work. When the user U1 is performing document preparation work, for example, the discomfort condition information 112_1 is used as the discomfort condition. For example, the discomfort condition information 112_2 indicates a discomfort condition in creative work. When the user U1 is performing creative work, for example, the discomfort condition information 112_2 is used as the discomfort condition.

The discomfort condition indicated by the discomfort condition information 112_1 is that frequency is 4 kHz or less, a sound pressure level is 6 dB or more higher than background noise, and fluctuation strength is high. Thus, the discomfort condition indicated by the discomfort condition information 112_1 includes three elements. The discomfort condition indicated by the discomfort condition information 112_1 can also be determined as one or more elements among the three elements.

Incidentally, the discomfort condition indicated by each of the discomfort condition information 112_1, 112_2, . . . , **112_*n* may differ from each other. Further, it is permissible even if a plurality of discomfort conditions among the discomfort conditions indicated by the discomfort condition information 112_1, 112_2, . . . , 112_*n* are the same as each other. Furthermore, the discomfort condition indicated by each of the discomfort condition information 112_1, 112_2, . . . , 112_*n*** may be a condition using a threshold value or a range.

It is permissible even if the schedule information 111 and the discomfort condition information 112_1, 112_2, . . . , **112_*n* are stored in a different device. The information processing device 100 may refer to the schedule information 111 and the discomfort condition information 112_1, 112_2, . . . , 112_*n*** stored in the different device. Incidentally, illustration of the different device is left out in the drawings.

Returning to FIG. 3, the first acquisition unit 120 will be described below.

The first acquisition unit 120 acquires a sound signal outputted from the mic 11.

The acoustic feature detection unit 130 detects acoustic features based on the sound signal. For example, the acoustic features are the frequency, the sound pressure level, the fluctuation strength, the direction in which a sound source exists, and so forth.

Next, a process that the second acquisition unit 140 is capable of executing will be described below.

The second acquisition unit 140 acquires application software information as information regarding application software activated in the terminal device 12. The information processing device 100 can recognize the application software activated in the terminal device 12.

The second acquisition unit 140 acquires an image obtained by the image capturing device 13 by capturing an image of the user U1.

The second acquisition unit 140 acquires sound caused by the user U1 performing the work. For example, the sound is typing noise. The second acquisition unit 140 acquires the sound from the mic 11 or a mic other than the mic 11.

The second acquisition unit 140 acquires voice uttered by the user U1. The second acquisition unit 140 acquires the voice from the mic 11 or a mic other than the mic 11.

The work type detection unit 150 detects the work type of the work performed by the user U1. The detected work type will be referred to also as a first work type. A process that the work type detection unit 150 is capable of executing will be described below.

The work type detection unit 150 detects the work type of the user U1 based on the application software information acquired by the second acquisition unit 140. For example, when the application software is document preparation software, the work type detection unit 150 detects that the user U1 is performing document preparation work.

The work type detection unit 150 detects the work type of the user U1 based on the image acquired by the second acquisition unit 140. For example, when the image indicates a state in which the user U1 is reading a book, the work type detection unit 150 uses an image recognition technology and thereby detects that the user U1 is performing work of reading a document.

The work type detection unit 150 detects the work type of the user U1 based on the sound caused by the user U1 performing the work. For example, the work type detection unit 150 analyzes the sound. As the result of the analysis, the work type detection unit 150 detects that the sound is typing noise. Then, based on the result of the detection, the work type detection unit 150 detects that the user U1 is performing document preparation work.

The work type detection unit 150 detects the work type of the user U1 based on the voice. For example, the work type detection unit 150 analyzes the content of the voice by using a voice recognition technology. As the result of the analysis, the work type detection unit 150 detects that the user U1 is performing creative work.

The work type detection unit 150 acquires the schedule information 111. The work type detection unit 150 detects the work type of the user U1 based on the present time and the schedule information 111. For example, when the present time is 10:30, the work type detection unit 150 detects that the user U1 is performing document preparation work.

The identification unit 160 identifies discomfort condition information corresponding to the work type detected by the work type detection unit 150, among the discomfort condition information 112_1, 112_2, . . . , **112_*n*, based on work type information indicating the work type detected by the work type detection unit 150. For example, when the user U1 is performing document preparation work, the identification unit 160 identifies the discomfort condition information 112_1. Incidentally, the identified discomfort condition information is referred to also as first discomfort condition information. The identification unit 160** acquires the identified discomfort condition information.

The output judgment unit 170 judges whether the masking sound should be outputted or not based on the acoustic features detected by the acoustic feature detection unit 130 and the discomfort condition information identified by the identification unit 160. In other words, the output judgment unit 170 judges whether the user U1 is feeling discomfort or not based on the acoustic features detected by the acoustic feature detection unit 130 and the discomfort condition information identified by the identification unit 160. As above, the output judgment unit 170 judges whether the user U1 is feeling discomfort or not by using the discomfort condition information corresponding to the type of the work performed by the user U1.

There is also a case where masking sound is already being outputted from the speaker 14 when the output judgment unit 170 executes the judgment process. In such the case, the output judgment unit 170 may also be described to judge whether new masking sound should be outputted or not based on the acoustic features detected by the acoustic feature detection unit 130 and the discomfort condition information identified by the identification unit 160.

When it is judged that the masking sound should be outputted, the sound masking control unit 180 has masking sound based on the acoustic features outputted from the speaker 14. Specifically, processes executed by the sound masking control unit 180 are executed by the determination unit 181 and the output unit 182. The processes executed by the determination unit 181 and the output unit 182 will be described later. Incidentally, the masking sound is referred to also as first masking sound.

Figure 5:
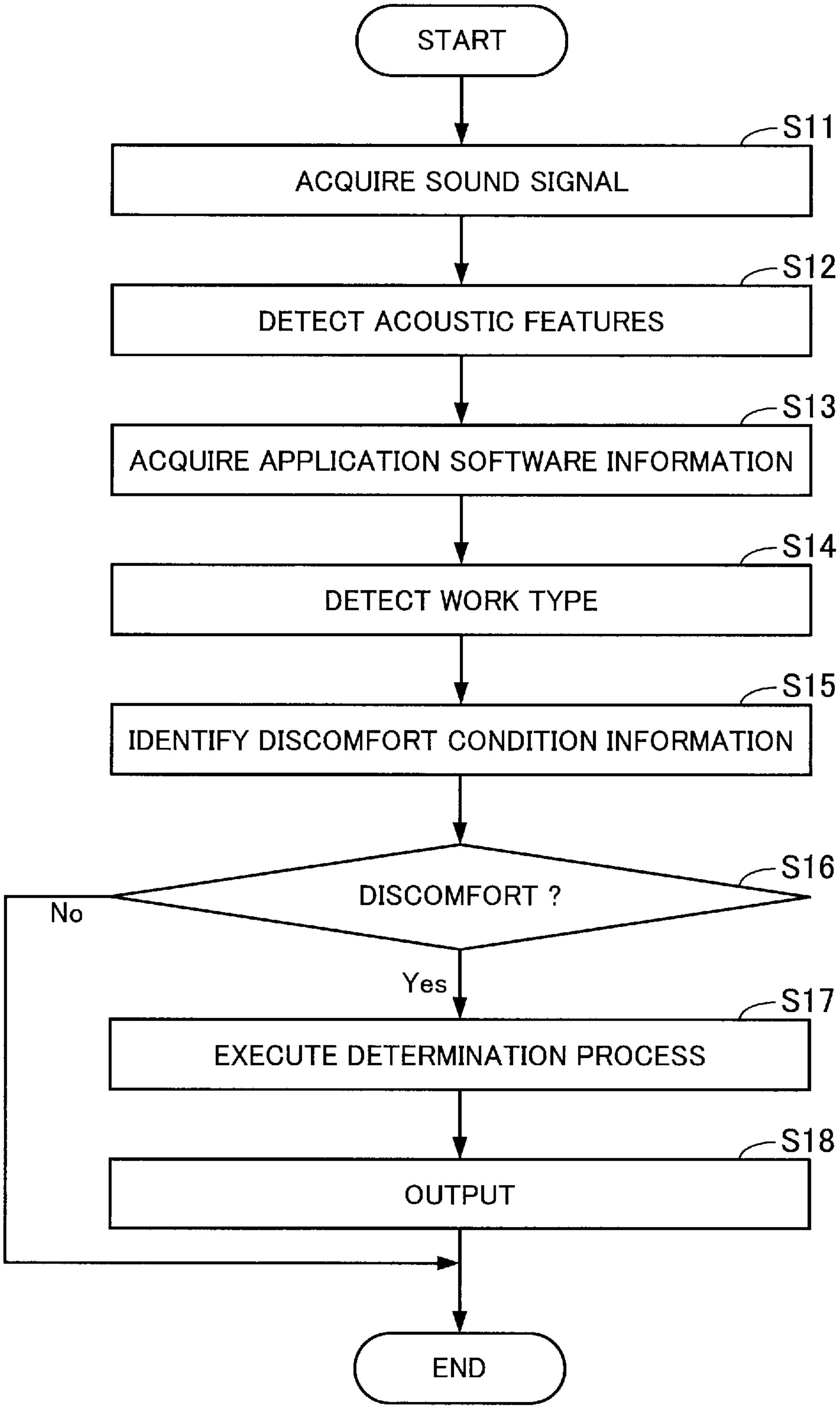
FIG. 5 is a flowchart showing an example of a process executed by the information processing device.

Next, a process executed by the information processing device 100 will be described below by using a flowchart. FIG. 5 is a flowchart showing an example of the process executed by the information processing device. There are cases where the process of FIG. 5 is started in a state in which the speaker 14 is outputting no masking sound. There are also cases where the process of FIG. 5 is started in a state in which the speaker 14 is outputting masking sound.

(Step S11) The first acquisition unit 120 acquires the sound signal outputted from the mic 11.

(Step S12) The acoustic feature detection unit 130 detects acoustic features based on the sound signal acquired by the first acquisition unit 120.

(Step S13) The second acquisition unit 140 acquires the application software information from the terminal device 12. The second acquisition unit 140 may also acquire an image or the like.

Here, it is also possible to execute the step S13 before the steps S11 and S12. When the work type detection unit 150 detects the work type of the user U1 by using the schedule information 111, the step S13 is left out.

(Step S14) The work type detection unit 150 detects the work type.

(Step S15) The identification unit 160 identifies the discomfort condition information corresponding to the type of the work performed by the user U1.

(Step S16) The output judgment unit 170 judges whether the user U1 is feeling discomfort or not based on the acoustic features detected by the acoustic feature detection unit 130 and the discomfort condition information identified by the identification unit 160. Specifically, the output judgment unit 170 judges that the user U1 is feeling discomfort if the acoustic features detected by the acoustic feature detection unit 130 satisfy the discomfort condition indicated by the discomfort condition information identified by the identification unit 160. When the user U1 is feeling discomfort, the process advances to step S17.

In contrast, if the acoustic features detected by the acoustic feature detection unit 130 do not satisfy the discomfort condition indicated by the discomfort condition information identified by the identification unit 160, the output judgment unit 170 judges that the user U1 is not feeling discomfort. When the user U1 is not feeling discomfort, the process ends.

Incidentally, when the judgment in the step S16 is No and the speaker 14 is outputting no masking sound, the sound masking control unit 180 does nothing. Namely, the sound masking control unit 180 executes control of outputting no masking sound. Thus, no masking sound is outputted from the speaker 14. When the judgment in the step S16 is No and the speaker 14 is already outputting masking sound, the sound masking control unit 180 executes control to continue the outputting of the masking sound.

(Step S17) The output judgment unit 170 judges that the masking sound should be outputted from the speaker 14. Specifically, when the speaker 14 is outputting no masking sound, the output judgment unit 170 judges that the masking sound should be outputted from the speaker 14 based on the acoustic features.

The determination unit 181 executes a determination process. For example, the determination unit 181 determines the output direction of the masking sound, the volume level of the masking sound, the type of the masking sound, and so forth.

In contrast, when the speaker 14 is already outputting masking sound, the determination unit 181 determines to change the already outputted masking sound to new masking sound based on the acoustic features. Incidentally, the already outputted masking sound is referred to also as second masking sound. The new masking sound is referred to also as the first masking sound.

(Step S18) The output unit 182 has the masking sound outputted from the speaker 14 based on the determination process. As above, the information processing device 100 is capable of putting the user U1 in a comfortable state by outputting the masking sound from the speaker 14.

As above, when it is judged that the masking sound should be outputted and masking sound is already being outputted from the speaker 14, the sound masking control unit 180 determines to change the already outputted masking sound to new masking sound and has the new masking sound outputted from the speaker 14. By this operation, the information processing device 100 is capable of putting the user U1 in the comfortable state.

Next, the process executed by the information processing device 100 will be described below by using a concrete example.

Figure 6:
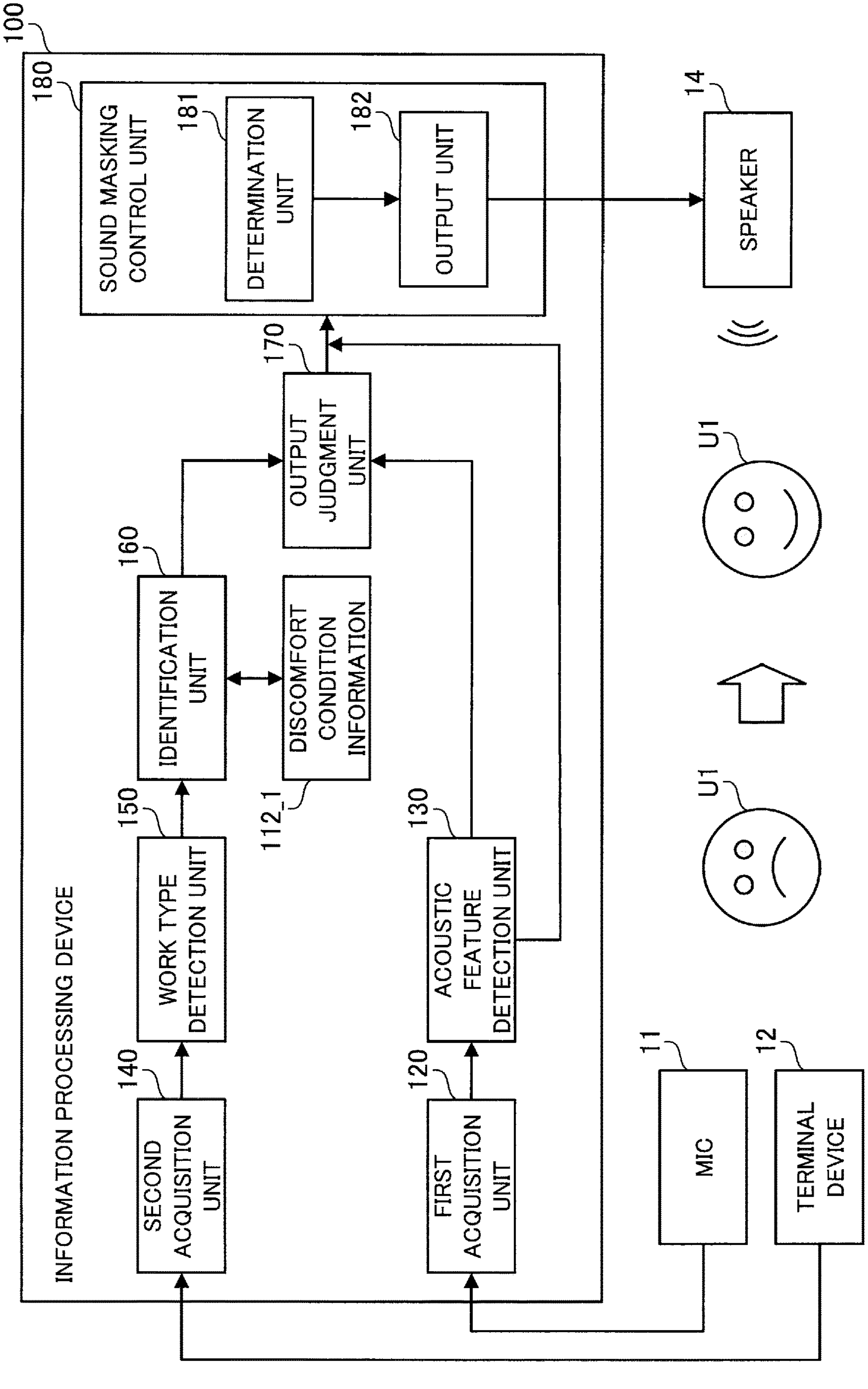
FIG. 6 is a diagram showing a concrete example of the process executed by the information processing device.

FIG. 6 is a diagram showing a concrete example of the process executed by the information processing device. FIG. 6 shows a state in which the user U1 is performing document preparation work by using the terminal device 12. The document preparation software has been activated in the terminal device 12. Here, a meeting suddenly starts in a front left direction from the user U1. The user U1 feels that voices from participants in the meeting or the like are noisy. Accordingly, the user U1 becomes uncomfortable.

The mic 11 acquires sound. This sound includes voices from the participants in the meeting or the like. The first acquisition unit 120 acquires the sound signal from the mic 11. The acoustic feature detection unit 130 detects the acoustic features based on the sound signal. The detected acoustic features indicate that the frequency is 4 kHz or less. The detected acoustic features indicate that the sound pressure level of the sound from the meeting is 48 dB. The detected acoustic features indicate that the fluctuation strength is high. The detected acoustic features indicate that the direction in which the sound source exists is the front left direction. Here, the acoustic feature detection unit 130 may also detect the sound pressure level of the background noise as an acoustic feature. For example, the acoustic feature detection unit 130 detects the sound pressure level of the background noise in a silent interval in the meeting. The sound pressure level of the background noise may also be measured previously. In FIG. 6, the sound pressure level of the background noise is assumed to be 40 dB.

The second acquisition unit 140 acquires the application software information from the terminal device 12. The application software information indicates the document preparation software.

Since the terminal device 12 has activated the document preparation software, the work type detection unit 150 detects that the user U1 is performing document preparation work.

The identification unit 160 identifies the discomfort condition information 112_1 corresponding to the document preparation work. The discomfort condition information 112_1 indicates that discomfort occurs when the frequency is 4 kHz or less, the sound pressure level is 6 dB or more higher than the background noise, and the fluctuation strength is high.

Since the acoustic features detected by the acoustic feature detection unit 130 satisfy the discomfort condition indicated by the discomfort condition information 112_1, the output judgment unit 170 judges that the user U1 is feeling discomfort. The output judgment unit 170 judges that the masking sound should be outputted from the speaker 14.

The determination unit 181 acquires the acoustic features from the acoustic feature detection unit 130. The determination unit 181 determines the masking sound based on the acoustic features. Further, the determination unit 181 determines the output direction of the masking sound based on the acoustic features. For example, the determination unit 181 determines that the masking sound should be outputted in the front left direction based on the direction in which the sound source exists. Furthermore, the determination unit 181 determines the sound pressure level based on the acoustic features. For example, the determination unit 181 may determine the sound pressure level at a sound pressure level lower than the sound pressure level of the sound from the meeting indicated by the acoustic feature. The determined sound pressure level is 42 dB, for example.

The output unit 182 has the masking sound outputted from the speaker 14 based on the result of the determination by the determination unit 181. The speaker 14 outputs the masking sound. By this process, the voices from the participants in the meeting or the like are masked. Then, the user U1 does not mind anymore the voices from the participants in the meeting or the like.

According to this embodiment, the information processing device 100 executes the sound masking control based on the acoustic features and the discomfort condition information corresponding to the work type of the user U1. Thus, the information processing device 100 is capable of executing sound masking control based on the work type of the user U1.

DESCRIPTION OF REFERENCE CHARACTERS

U1: user, 11: mic, 12: terminal device, 13: image capturing device, 14: speaker, 100: information processing device, 101: processor, 102: volatile storage device, 103: nonvolatile storage device, 110: storage unit, 111: schedule information, 112_1, 112_2, . . . , **112_*n*: discomfort condition information, 120: first acquisition unit, 130: acoustic feature detection unit, 140: second acquisition unit, 150: work type detection unit, 160: identification unit, 170: output judgment unit, 180: sound masking control unit, 181: determination unit, 182**: output unit.

What is claimed is:

1. An information processing device comprising:

a processor to execute a program; and a memory to store the program which, when executed by the processor, performs processes of, acquiring a sound signal outputted from a microphone;

detecting an acoustic feature based on the sound signal;

acquiring application software information as information regarding application software activated in a terminal device used by a user;

detecting a first work type of work performed by the user based on the application software information;

identifying first discomfort condition information corresponding to a first work type, among one or more pieces of discomfort condition information specifying discomfort conditions using the acoustic feature and corresponding to one or more work types, based on work type information indicating the first work type; and judging whether first masking sound should be outputted or not based on the detected acoustic feature and the first discomfort condition information.

2. The information processing device according to claim 1, wherein the program which, when executed by the processor, performs a process of judging that the first masking sound should be outputted when the detected acoustic feature satisfies the discomfort condition indicated by the first discomfort condition information.

3. The information processing device according to claim 1, wherein the program which, when executed by the processor, performs a process of having the first masking sound based on the acoustic feature outputted from a speaker when it is judged that the first masking sound should be outputted.

4. The information processing device according to claim 3, wherein when it is judged that the first masking sound should be outputted and second masking sound is being outputted from the speaker, the program which, when executed by the processor, performs processes of, determining to change the second masking sound to the first masking sound and having the first masking sound outputted from the speaker.

5. The information processing device according to claim 1, wherein the discomfort condition information includes at least one of frequency, sound pressure level, and fluctuation strength of each work type of work performed by the user.

6. A sound masking system comprising:

a speaker; and an information processing device, wherein the information processing device includes:

a processor to execute a program; and a memory to store the program which, when executed by the processor, performs processes of, acquiring a sound signal outputted from a microphone;

detecting an acoustic feature based on the sound signal;

acquiring application software information as information regarding application software activated in a terminal device used by a user;

detecting a first work type of work performed by the user based on the application software information;

identifying first discomfort condition information corresponding to the first work type, among one or more pieces of discomfort condition information specifying discomfort conditions using the acoustic feature and corresponding to one or more work types, based on work type information indicating the first work type; and judging whether first masking sound should be outputted from the speaker or not based on the detected acoustic feature and the first discomfort condition information.

7. A control method performed by an information processing device, the control method comprising:

acquiring a sound signal outputted from a microphone, detecting an acoustic feature based on the sound signal, acquiring application software information as information regarding application software activated in a terminal device used by a user, detecting a first work type of work performed by the user based on the application software information, and identifying first discomfort condition information corresponding to the first work type, among one or more pieces of discomfort condition information specifying discomfort conditions using the acoustic feature and corresponding to one or more work types, based on work type information indicating the first work type; and judging whether first masking sound should be outputted or not based on the detected acoustic feature and the first discomfort condition information.

8. A non-transitory computer-readable recording medium storing a control program that causes an information processing device to execute a process of:

acquiring a sound signal outputted from a microphone, detecting an acoustic feature based on the sound signal, acquiring application software information as information regarding application software activated in a terminal device used by a user, detecting a first work type of work performed by the user based on the application software information, identifying first discomfort condition information corresponding to the first work type, among one or more pieces of discomfort condition information specifying discomfort conditions using the acoustic feature and corresponding to one or more work types, based on work type information indicating the first work type, and judging whether first masking sound should be outputted or not based on the detected acoustic feature and the first discomfort condition information.

* * * * *